(12) United States Patent
Matsumoto et al.

(10) Patent No.: US 7,180,259 B2
(45) Date of Patent: Feb. 20, 2007

(54) DRIVING APPARATUS FOR DRIVING MULTIPLE INDUCTION MOTORS

(75) Inventors: Yasushi Matsumoto, Tokyo (JP); Hidetoshi Umida, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 0 days.

(21) Appl. No.: 11/175,024

(22) Filed: Jul. 6, 2005

(65) Prior Publication Data
US 2006/0012322 A1 Jan. 19, 2006

(30) Foreign Application Priority Data
Jul. 6, 2004 (JP) ............................. 2004-199098

(51) Int. Cl.
*H02P 7/00* (2006.01)
(52) U.S. Cl. .................... 318/432; 318/727; 318/801; 318/802; 318/434; 318/435
(58) Field of Classification Search ................ 318/432, 318/727, 801, 800, 802, 825, 827, 434, 433; 363/44
See application file for complete search history.

(56) References Cited

U.S. PATENT DOCUMENTS 6,549,436 B1 * 4/2003 Sun .............................. 363/44

2003/0128554 A1 * 7/2003 Crewson et al. .............. 363/16

FOREIGN PATENT DOCUMENTS

| JP | 2000-060198 | 2/2000 |
|----|-------------|--------|
| JP | 2001-054299 | 2/2001 |
| JP | 2002-112404 | 4/2002 |
| JP | 2002-281606 | 9/2002 |
| JP | 2003-134603 | 5/2003 |

* cited by examiner

*Primary Examiner*—Karen Masih
(74) *Attorney, Agent, or Firm*—Rabin & Berdo, P.C.

(57) ABSTRACT

The driving apparatus according to the invention includes an inverter that drives multiple induction motors connected in parallel, and a secondary current calculating circuit that calculates the components $i_{2W}$ and $i_{2L}$ of a total secondary current value, which is the sum of the secondary currents of all the motors. The apparatus further includes a current deviation quantity calculating circuit that calculates a deviation quantity, for which the total secondary current value deviates from a reference trace. A torque regulating circuit regulates the motor torque based on the calculated deviation quantity. The driving apparatus for driving multiple induction motors according to the invention facilitates quickly detecting the widening caused in the rotating speed differences and preventing the rotating speed differences from widening.

2 Claims, 12 Drawing Sheets

DRIVING APPARATUS FOR DRIVING MULTIPLE INDUCTION MOTORS

FIELD OF THE INVENTION

The invention relates to a driving apparatus including an inverter for driving multiple induction motors (hereinafter referred to simply as "motors" sometimes) that do not include any rotating speed detector. More specifically, the invention relates to a driving apparatus including an inverter for driving multiple motors that facilitates detecting the differences between the rotating speeds of the motors and preventing the rotating speed differences from widening.

BACKGROUND OF THE INVENTION

FIG. 11 is a block circuit diagram of a first conventional driving apparatus including an inverter for driving a multiple induction motors, not provided with any rotating speed detector. In FIG. 11, N represents the number of the induction motors. The first conventional driving apparatus includes an inverter 1, current detectors 21, 22, and 23 that detect the output currents from the inverter 1, induction motors 31 through 3N, and a controller 11. The controller 11 includes a rotating speed estimator 40, a trans-vector control calculator 41, a torque regulator 110, and a subtractor 45.

The controller 11 works in the following manner. The rotating speed estimator 40 estimates the rotating speed based on the three-phase reference voltages $v_U^*$, $v_V^*$, $v_W^*$ (hereinafter referred to as "primary reference voltages") outputted from the trans-vector control calculator circuit 41 and the inverter output currents $i_U$, $i_V$, $i_W$ detected by the current detectors 21, 22, 23. The estimated rotating speed $\omega\#$ outputted from the rotating speed estimator 40, the second reference torque $\tau^{**}$ outputted from the subtractor 45, the reference magnetic flux $\phi^*$, and the inverter output currents $i_U$, $i_V$, $i_W$ detected by the current detectors 21, 22, 23 are inputted to the trans-vector control calculator circuit 41. The trans-vector control calculator circuit 41 conducts trans-vector control calculation based on the inputs described above and outputs primary reference voltages $v_U^*$, $v_V^*$, and $v_W^*$.

The torque regulator circuit 110 judges that the rotating speed differences have widened when the time variation rate of the estimated rotating speed $\omega\#$ outputted from the rotating speed estimator 40 exceeds a specified value and outputs a torque reduction quantity $\Delta\tau$. The subtractor 45 subtracts the torque reduction quantity $\Delta\tau$ outputted from the torque regulator circuit 110 from first reference torque $\tau^*$ and outputs second reference torque $\tau^{**}$. The rotating speed differences are prevented from widening as described above.

The rotating speed, which the rotating speed estimator 40 can estimate, is the average rotating speed of N motors. In the case of a driving apparatus for driving a railway car, very often one inverter drives four or more motors. Therefore, even when the rotating speed differences are widened due to the rotating speed up or the rotating speed down of one motor, the rotating speed difference widening will not be detected, if none of the rotating speed differences exceeds a certain limit to the wider side.

Japanese patent publication JP P 2002-281606 A (pp. 5–6, FIG. 1) discloses a second conventional driving apparatus for obviating the problem described above. FIG. 12 is a block circuit diagram of the second conventional driving apparatus shown in FIG. 1 of JP P 2002-281606 A. In FIG. 12, the second conventional driving apparatus drives two motors exemplary (N=2). The second conventional driving apparatus shown in FIG. 12 provides a motor 31 with current detectors 24, 25, 26 and a motor 32 with current detectors 27, 28, 29 and includes a slip/slide detector 121 that detects the rotating speed difference widening based on the relative difference of each motor current.

In detail, a coordinate transforming circuit 120 transforms the three-phase motor currents to two-phase quantities on the rotatory coordinate axes (dq-axes) used in trans-vector control according to the following formulas (1), (2) and calculates the q-axis currents $i_{1q1}$ and $i_{1g2}$ for the respective motors. In the formulas (1) and (2), $\theta$ is a reference phase angle calculated in the trans-vector control calculator circuit 41 and used for the trans-vector control calculations.

$$\begin{vmatrix} i_{1d1} \\ i_{1q1} \end{vmatrix} = \begin{vmatrix} 2/3 \cos\theta & -1/3 \cos\theta + 1/\sqrt{3} \sin\theta & -1/3 \cos\theta - 1\sqrt{3} \sin\theta \\ 2/3 \sin\theta & -1/3 \sin\theta + 1/\sqrt{3} \cos\theta & -1/3 \sin\theta - 1/\sqrt{3} \cos\theta \end{vmatrix} \begin{vmatrix} i_{U1} \\ i_{V1} \\ i_{W1} \end{vmatrix} \quad (1)$$

$$\begin{vmatrix} i_{1d2} \\ i_{1q2} \end{vmatrix} = \begin{vmatrix} 2/3 \cos\theta & -1/3 \cos\theta + 1/\sqrt{3} \sin\theta & -1/3 \cos\theta - 1\sqrt{3} \sin\theta \\ 2/3 \sin\theta & -1/3 \sin\theta + 1/\sqrt{3} \cos\theta & -1/3 \sin\theta - 1/\sqrt{3} \cos\theta \end{vmatrix} \begin{vmatrix} i_{U2} \\ i_{V2} \\ i_{W2} \end{vmatrix} \quad (2)$$

Although the q-axis currents $i_{1q1}$ and $i_{1g2}$ for the respective motors do not cause any difference as shown in FIGS. 13A–13C as far as the rotating speed deviations of the respective motors are small, the q-axis currents $i_{1q1}$ and $i_{1g2}$ cause a difference as shown in FIGS. 14A–14C when the rotating speed deviations of the respective motors are large. Considering these characteristics, the second conventional driving apparatus quickly detects, with the slip/slide detector 121, a motor rotating speed difference $\Delta\omega_s$ from the deviations of the q-axis currents $i_{1q1}$ and $i_{1g2}$ for the respective motors and reduces, before the rotating speed difference becomes wide, the torque by the torque reduction quantity $\Delta\tau$ calculated in a torque regulator circuit 122 to obviate the problem of the first conventional driving apparatus.

However, it is necessary for the second conventional driving apparatus shown in the JP P 2002-281606. A to provide every motor with current detectors. For driving a railway car by the second conventional driving apparatus, it is necessary to arrange the current detectors in the bogie of the car, since the power lines to the motors are divided in the bogie. Therefore, it is necessary for the current detectors to exhibits excellent resistance to vibration. In view of the foregoing, it would be desirable to provide a driving apparatus for driving multiple motors that makes it unnecessary to provide every motor with current detectors, and that facilitates quickly detecting the widening of the differences between the motor rotating speeds so that such widening may be prevented.

SUMMARY OF THE INVENTION

According to one aspect of the invention, there is provided a driving apparatus for multiple induction motors connected in parallel to each other, wherein the driving apparatus includes a current calculator circuit that calculates a total secondary current value, which is the sum of secondary currents of all the induction motors; and a torque regulator circuit that regulates the torque based on the calculated total secondary current value. An advantage of this construction is that the rotating speed differences are prevented quickly from widening by regulating the torque based on the total secondary current value.

According to another aspect of the invention, a driving apparatus for driving multiple induction motors connected in parallel to each other includes; a current calculator circuit that calculates a total secondary current value, which is the sum of the secondary currents of all the induction motors, a current deviation quantity calculator circuit that calculates a current deviation quantity, for which the total secondary current value deviates from a reference current value; and a torque regulator circuit that regulates the torque based on the calculated current deviation. Advantages of this construction are that the rotating speed difference widening is detected quickly by monitoring the deviation quantity of the total secondary current from a reference trace (current value) and the rotating speed differences quickly are prevented from widening by regulating the torque based on the amount of deviation of the total secondary current. In one example, the reference current value is corrected based on the calculated total secondary current value. In this example, even when errors are caused between the motor constants set in advance and the actual motor constants, the rotating speed difference widening is detected quickly and the rotating speed differences are prevented from widening by regulating the setting errors.

According to still another aspect of the invention, a driving apparatus for driving multiple induction motors connected in parallel to each other is provided with a current calculator circuit that calculates a total secondary current value, which is the sum of the secondary currents of all induction the motors, a phase difference calculator circuit that calculates the phase differences between the total secondary current value and the output voltage from the inverter, a phase deviation quantity calculator circuit that calculates a phase difference deviation quantity, for which the calculated phase difference deviates from a reference phase difference, and a torque regulator circuit that regulates the torque based on the calculated phase difference deviation quantity. Advantages of this construction are that the rotating speed difference widening is detected quickly by monitoring the deviation quantity, from the reference value, of the phase difference between the total secondary current and the primary voltage, and the rotating speed differences are prevented quickly from widening by regulating the torque based on the deviation quantity of the phase difference between the total secondary current and the primary voltage. In one example, the reference phase difference is corrected based on the calculated phase difference. In this example as well, even when errors are caused between the motor constants set in advance and the actual motor constants, the rotating speed difference widening is detected quickly and the rotating speed differences are prevented from widening by regulating the setting errors.

DETAILED DESCRIPTION OF THE PREFERRED EMBODIMENTS

Figure 1:
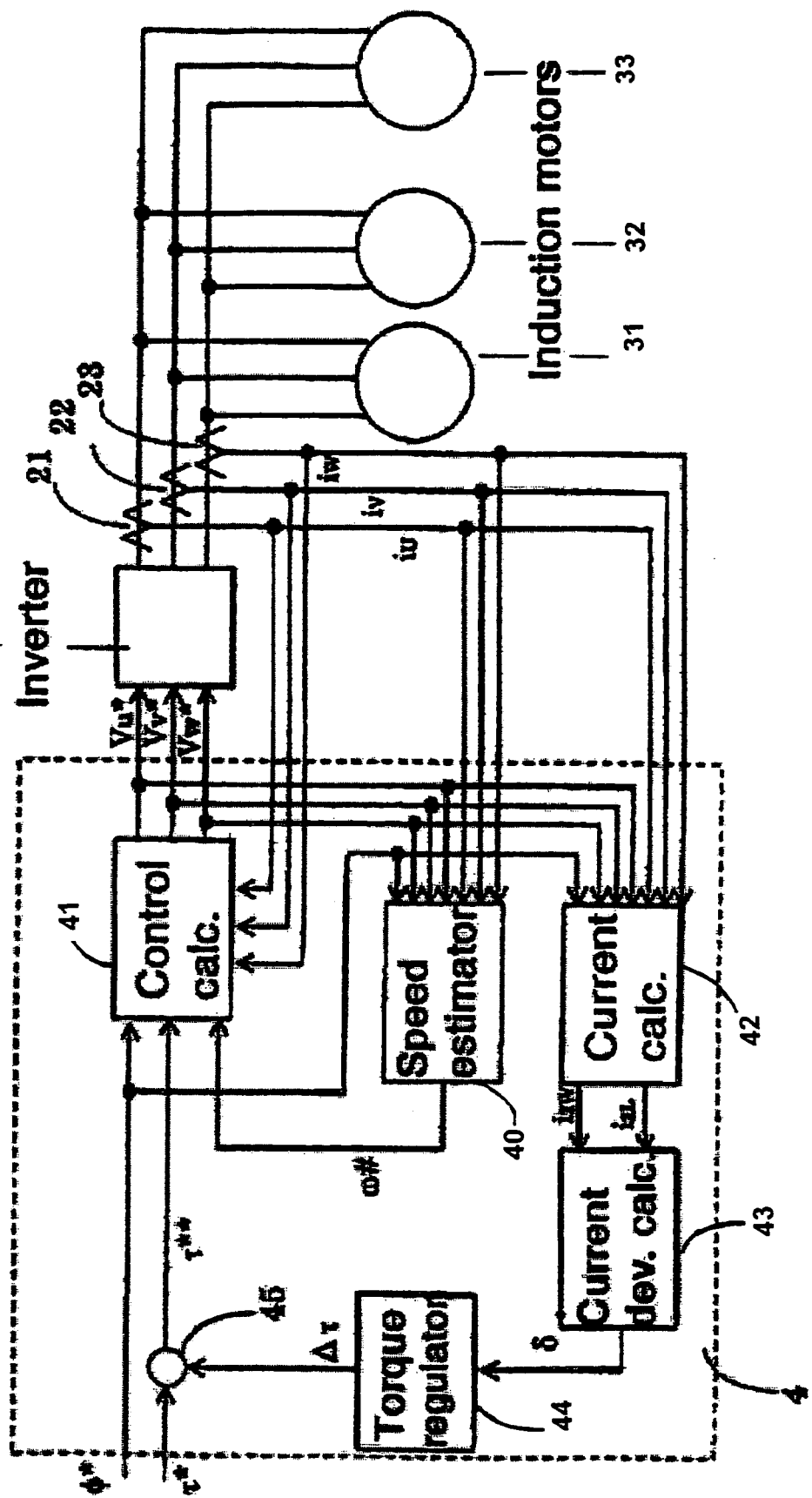
FIG. 1 is a block circuit diagram of a driving apparatus for driving multiple induction motors according to a first embodiment of the invention.
Figure 11:
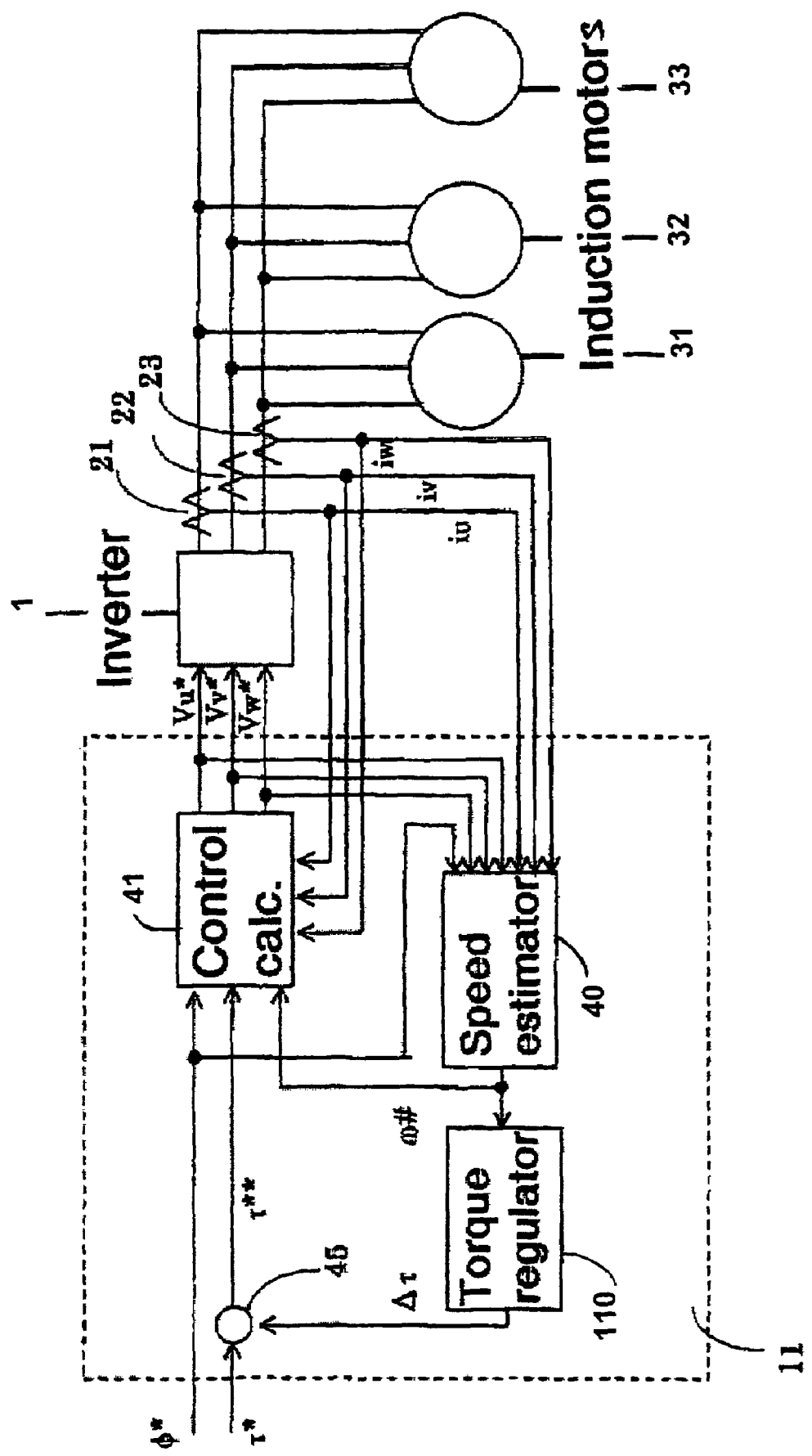
FIG. 11 is a block circuit diagram of a first conventional driving apparatus including an inverter for driving multiple induction motors.
Figure 12:
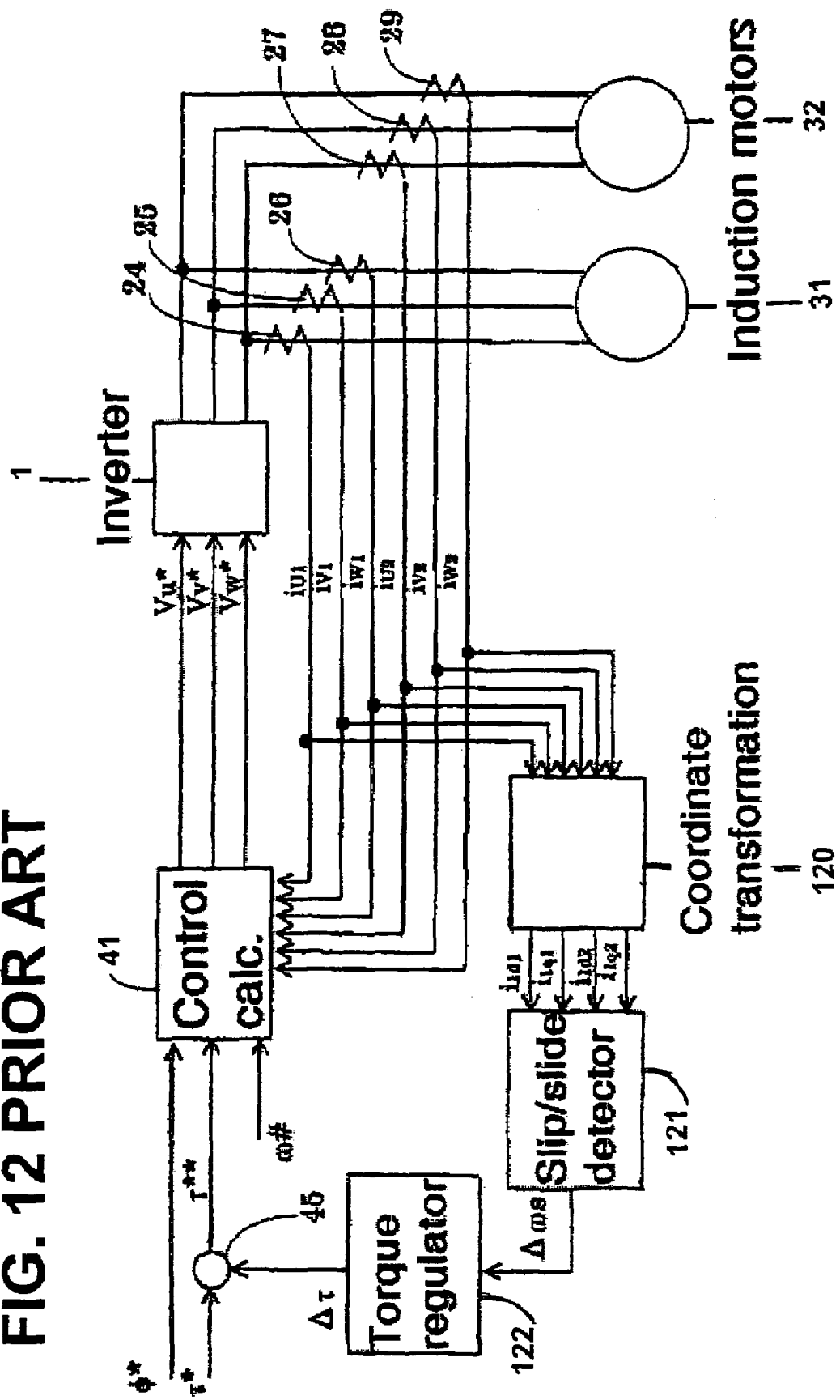
FIG. 12 is a block circuit diagram of a second conventional driving apparatus shown in JP P 2002-281606 A.
Figure 13A:
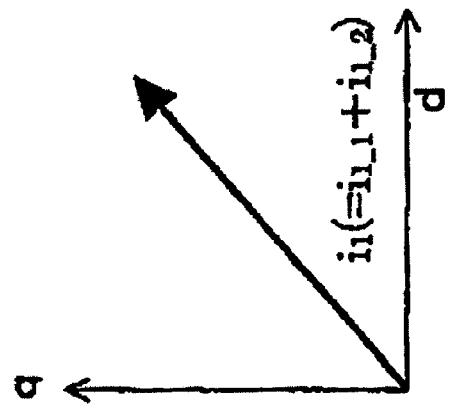
FIGS. 13A–13C are vector diagrams for use in describing the operations of the second conventional driving apparatus when the rotating speed difference is small.
Figure 13B:
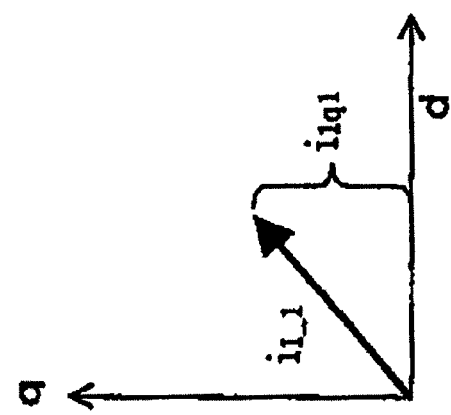
Figure 13C:
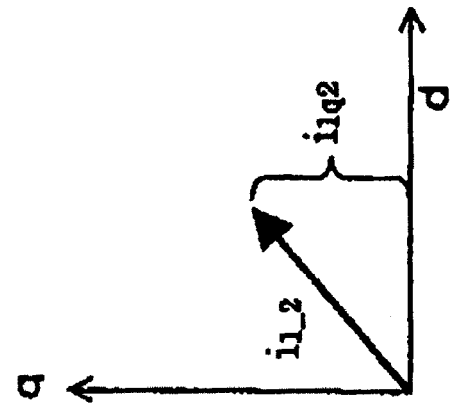
Figure 14A:
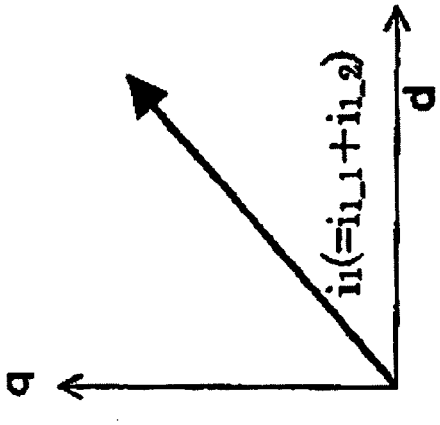
FIGS. 14A–14C are vector diagrams for use in describing the operations of the second conventional driving apparatus when the rotating speed difference is wide.
Figure 14B:
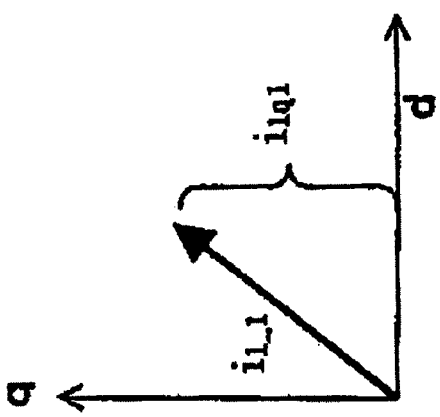
Figure 14C:
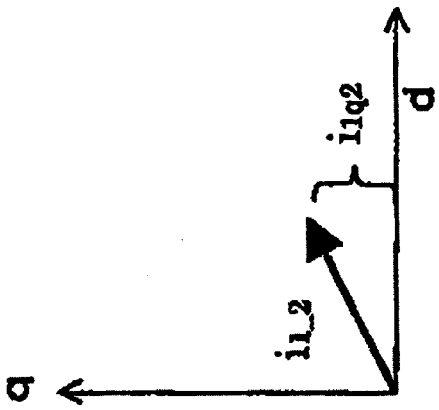

FIG. 1 is a block circuit diagram of a driving apparatus for driving multiple induction motors according to the first embodiment of the invention. Referring now to FIG. 1, the driving apparatus according to the first embodiment includes, in the same manner as the first conventional driving apparatus shown in FIG. 11, an inverter 1, current detectors 21, 22, and 23 that detect the output currents from the inverter 1, induction motors 31 through 3N, and a controller 4. The controller 4 is a little bit different from the controller shown in FIG. 11. In FIG. 1, the controller 4 includes a rotating speed estimating circuit 40, a trans-vector control calculating circuit 41, a secondary current calculating circuit 42, a current deviation quantity calculating circuit 43, and a torque regulating circuit 44.

Now the operations of the controller 4 will be described below. The primary reference voltages $v_U{}^*$, $v_V{}^*$, $v_W{}^*$ outputted from the trans-vector control calculating circuit 41, the inverter output currents $i_U$, $i_V$, $i_W$ detected by the current detectors 21, 22, 23, and the reference magnetic flux $\phi^*$ are inputted to the secondary current calculating circuit 42. The secondary current calculating circuit 42 resolves the sum of the secondary currents of all the motors (hereinafter referred to as the "total secondary current") into a component $i_{2W}$ in the same phase with the primary voltage vector (hereinafter referred to as the "W-axis component") and a component $i_{2L}$ delaying by 90° from the primary voltage vector (hereinafter referred to as the "L-axis component") based on the following formulas (3) through (7).

$$\begin{vmatrix} v_d \\ v_q \end{vmatrix} = \begin{vmatrix} 2/3\cos\theta & -1/3\cos\theta + 1/\sqrt{3}\sin\theta & -1/3\cos\theta - 1\sqrt{3}\sin\theta \\ 2/3\sin\theta & -1/3\sin\theta + 1/\sqrt{3}\cos\theta & -1/3\sin\theta - 1/\sqrt{3}\cos\theta \end{vmatrix} \begin{vmatrix} v_{U^*} \\ v_{V^*} \\ v_{W^*} \end{vmatrix} \quad (3)$$

$$\begin{vmatrix} i_{1d} \\ i_{1q} \end{vmatrix} = \begin{vmatrix} 2/3\cos\theta & -1/3\cos\theta + 1/\sqrt{3}\sin\theta & -1/3\cos\theta - 1\sqrt{3}\sin\theta \\ 2/3\sin\theta & -1/3\sin\theta + 1/\sqrt{3}\cos\theta & -1/3\sin\theta - 1/\sqrt{3}\cos\theta \end{vmatrix} \begin{vmatrix} i_U \\ i_V \\ i_W \end{vmatrix} \quad (4)$$

$$i_{2q} = i_{1q} - i_{Mq} \quad (5)$$
$$= i_{1q} - (N \cdot v_q/r_M - N \cdot v_d/x_M)$$

$$i_{2d} = i_{1d} - i_{Md} \quad (6)$$
$$= i_{1d} - (N \cdot v_d/r_M - N \cdot v_q/x_M)$$

Here, $r_M$ is the iron loss resistance and $x_M$ the exciting reactance.

$$\begin{vmatrix} i_{2L} \\ i_{2W} \end{vmatrix} = \begin{vmatrix} \cos\alpha & -\sin\alpha \\ \sin\alpha & \cos\alpha \end{vmatrix} \begin{vmatrix} i_{2d} \\ i_{2q} \end{vmatrix} \quad (7)$$

Here, $\alpha$ is the angle obtained from the following formula.

$$\alpha = \tan^{-1}(v_d/v_q)$$

The W-axis component $i_{2W}$ and the L-axis component $i_{2L}$ of the total secondary current outputted from the secondary current calculating circuit 42 are inputted to the current deviation quantity calculating circuit 43. The current deviation quantity calculating circuit 43 calculates a current deviation quantity δ from the following formula (8) using the inputted W- and L-axes components $i_{2W}$ and $i_{2L}$. In the formulas (5), (6), and (8), N represents the number of the motors.

$$\delta = (i_{2L} - (N \cdot \phi^*/2L\sigma))^2 + i_{2W}^2 - (N \cdot \phi^*/2L\sigma)^2 \quad (8)$$

Lσ in the formula (8) is the leakage inductance obtained from the following formula (9). The denominator $\omega_1^*$ in the formula (9) is a reference inverter frequency calculated in the trans-vector control calculating circuit 41 and used for trans-vector control calculation.

$$L\sigma = (x_1 + x_2)/\omega_1^* \quad (9)$$

The torque regulating circuit 44 calculates a torque reduction quantity Δτ based on the current deviation quantity δ outputted from the current deviation quantity calculating circuit 43 and the time variation of the current deviation quantity δ. Since the other operations are the same as those of the conventional driving apparatus shown in FIG. 11, the explanations thereof are omitted for the sake of avoiding redundancy. As described below, the widening caused in the rotating speed differences is detected based on the current deviation quantity δ defined by the foregoing formula (8).

Figure 2:
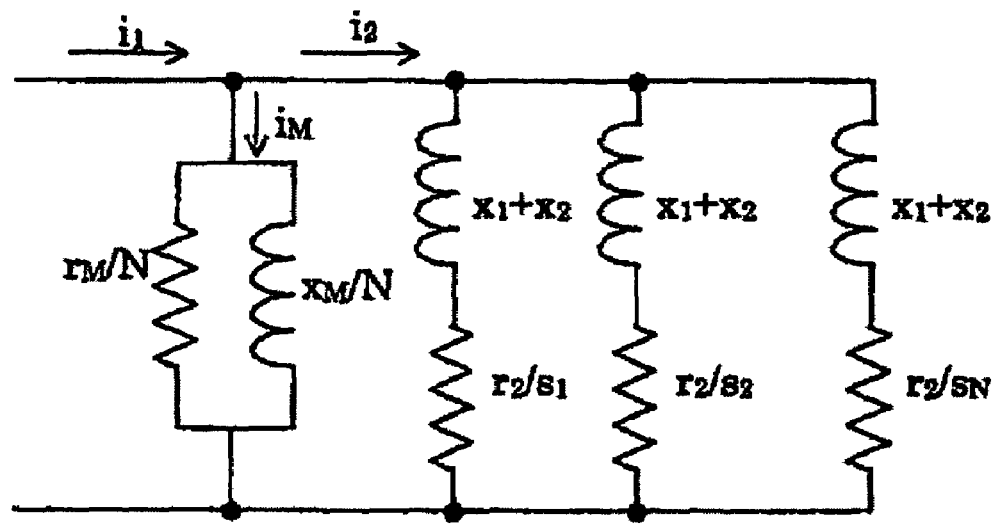
FIG. 2 is an equivalent circuit of multiple induction motors connected in parallel and represented by the L-type equivalent circuits thereof.

FIG. 2 is an equivalent circuit of multiple induction motors connected in parallel and represented by the L-shaped equivalent circuits thereof. In FIG. 2, $i_1$ represents a primary current (total), $i_2$ a secondary current (total), $i_M$ an exciting current (total), $r_M$ iron loss resistance, $x_M$ exciting reactance, $r_1$ primary resistance, $r_2$ secondary resistance, $x_1$ primary leakage reactance, $x_2$ secondary leakage reactance, and $s_1$ through $s_N$ slips. For deriving the equivalent circuit described FIG. 2, it is assumed that the differences between the motor constants are small. The foregoing formulas (5) and (6) are derived from the equivalent circuit shown in FIG. 2.

Figure 3:
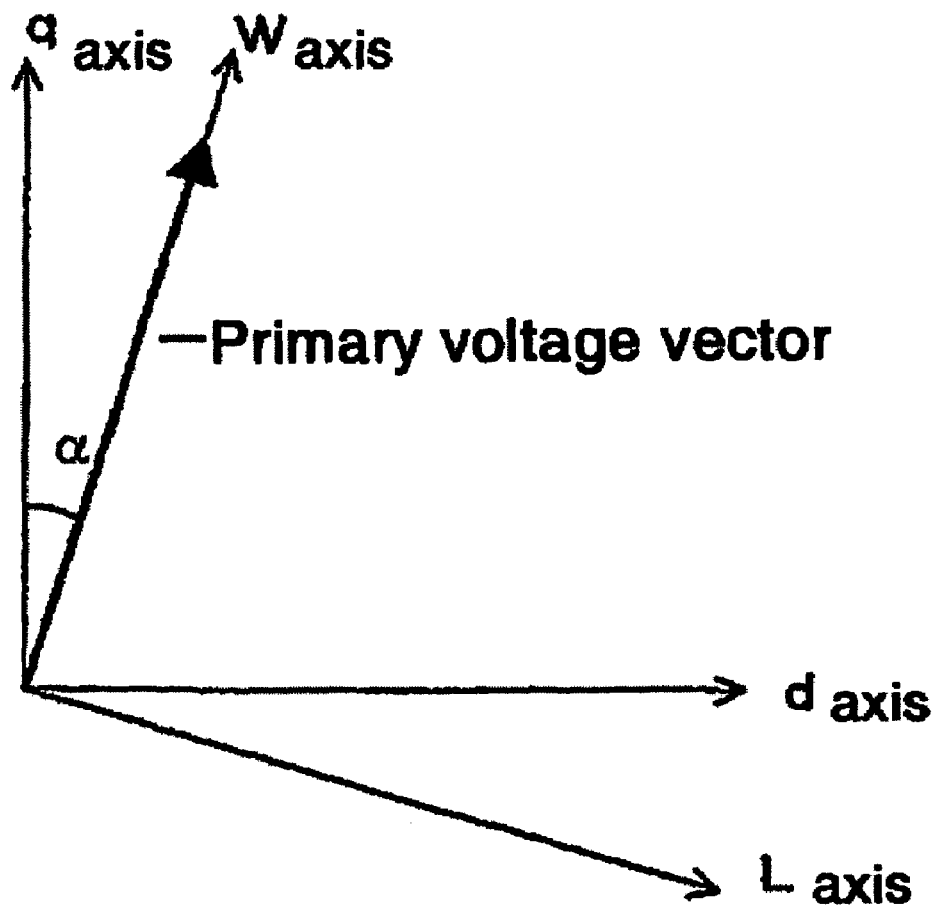
FIG. 3 is a vector diagram describing the primary reference voltage on the rotatory coordinate system (dq-axes coordinate system) with the magnetic flux as its reference.
Figure 4:
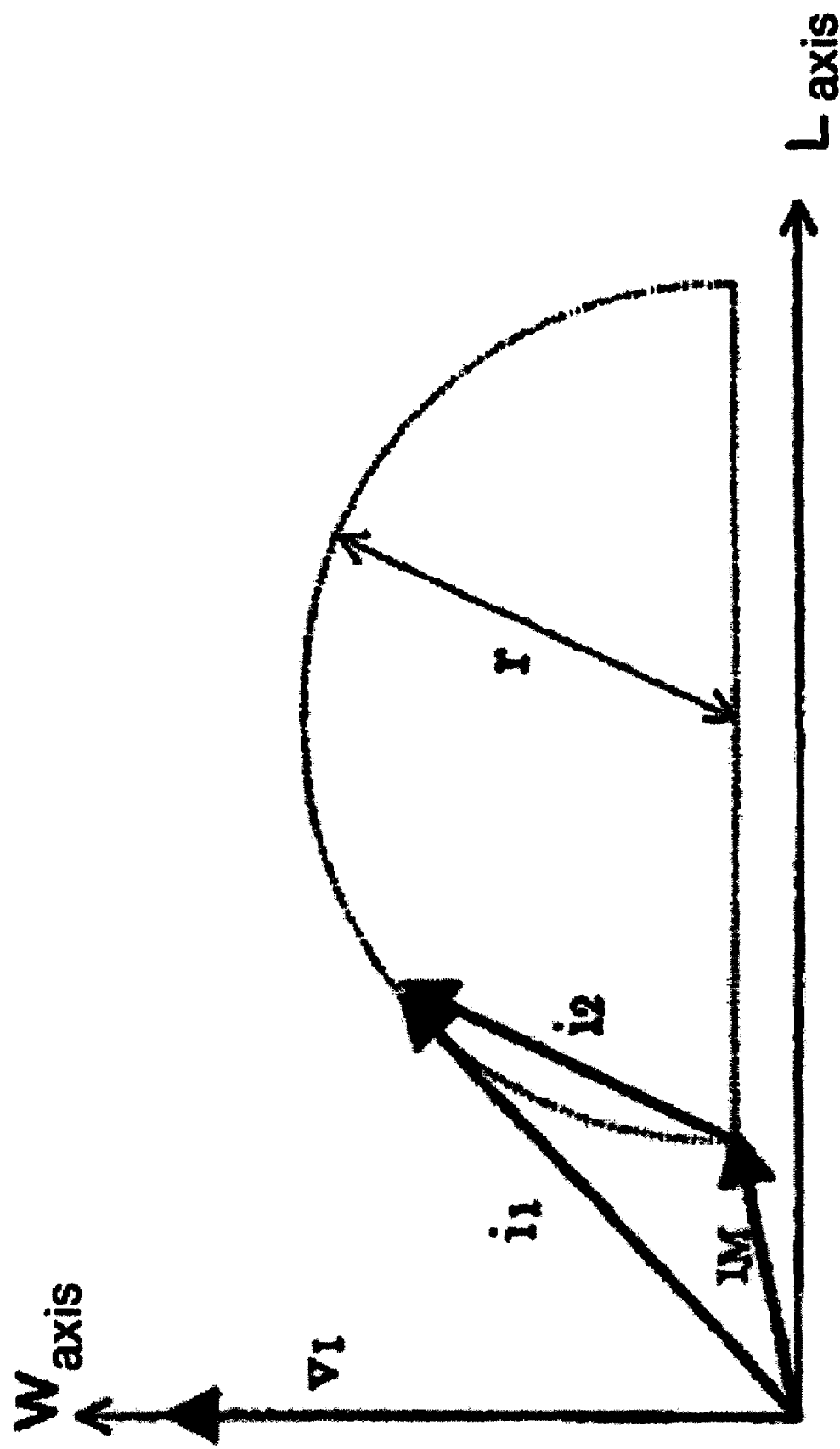
FIG. 4 is a vector diagram describing the primary voltage vector, the primary current vector, the secondary current vector and the exciting current vector.

FIG. 3 is a vector diagram describing the primary reference voltage on the rotatory coordinate system (dq-axes coordinate system) with the magnetic flux as its reference. Therefore, the coordinate transformation from the dq-axes coordinate system to the rotatory coordinate system (WL-axes coordinate system) with the primary voltage vector as its reference is performed using the foregoing formula (7). When the deviations between the slips of the motors are small, that is, when the rotating speed differences are small, the primary voltage vector and the current vectors extend as shown in FIG. 4, and the point of the secondary current vector is always on the circumference of a circle, the radius thereof being r, expressed by the following formula (10).

$$r = N \cdot |V_1|/2(x_1 + x_2) \equiv N \cdot |\omega_1^*| \cdot \phi^*/2\omega_1^* L_\sigma \quad (10)$$
$$= N \cdot \phi^*/2L_\sigma$$

The point of the secondary current vector removes from the circumference to the inside of the circle independently of the trans-vector control operations when the rotating speed differences widen. The displacement from the circumference is longer as the rotating speed differences are wider. Therefore, the widening caused in the rotating speed differences is detected quickly with the deviation quantity δ from the circumference described by the foregoing formula (8). And, the rotating speed differences are prevented from widening by regulating the reference torque based on the deviation quantity δ and the time variation thereof.

Figure 5:
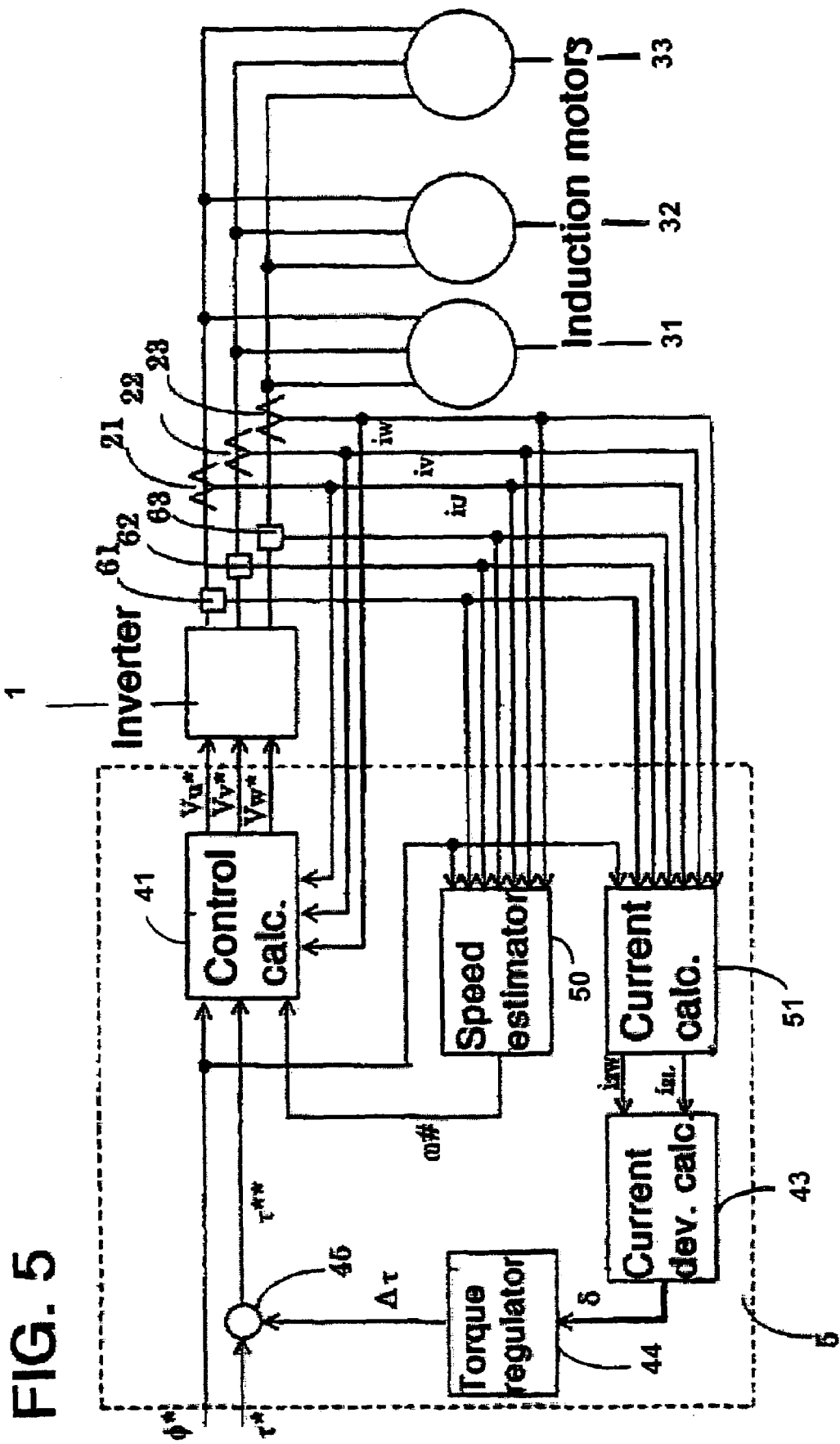
FIG. 5 is a block circuit diagram of a driving apparatus for driving multiple induction motors according to a second embodiment of the invention.

FIG. 5 is a block circuit diagram of a driving apparatus for driving multiple induction motors according to the second embodiment of the invention. Now the specific feature of the driving apparatus according to the second embodiment is described below. The driving apparatus according to the second embodiment uses the inverter output voltages $v_U$, $v_V$, and $v_W$ detected by voltage detectors 61, 62, and 63 in place of the primary reference voltages $v_U^*$, $v_V^*$, and $v_W^*$ outputted from the trans-vector control calculating circuit 41. The inverter output voltages $v_U$, $v_V$, and $v_W$ are inputted also to a rotating speed estimating circuit 50 and a secondary current calculating circuit 51. Since the other configurations and operations are the same as those described with reference to FIG. 1, their detailed descriptions are omitted for the sake of simplicity.

Figure 6:
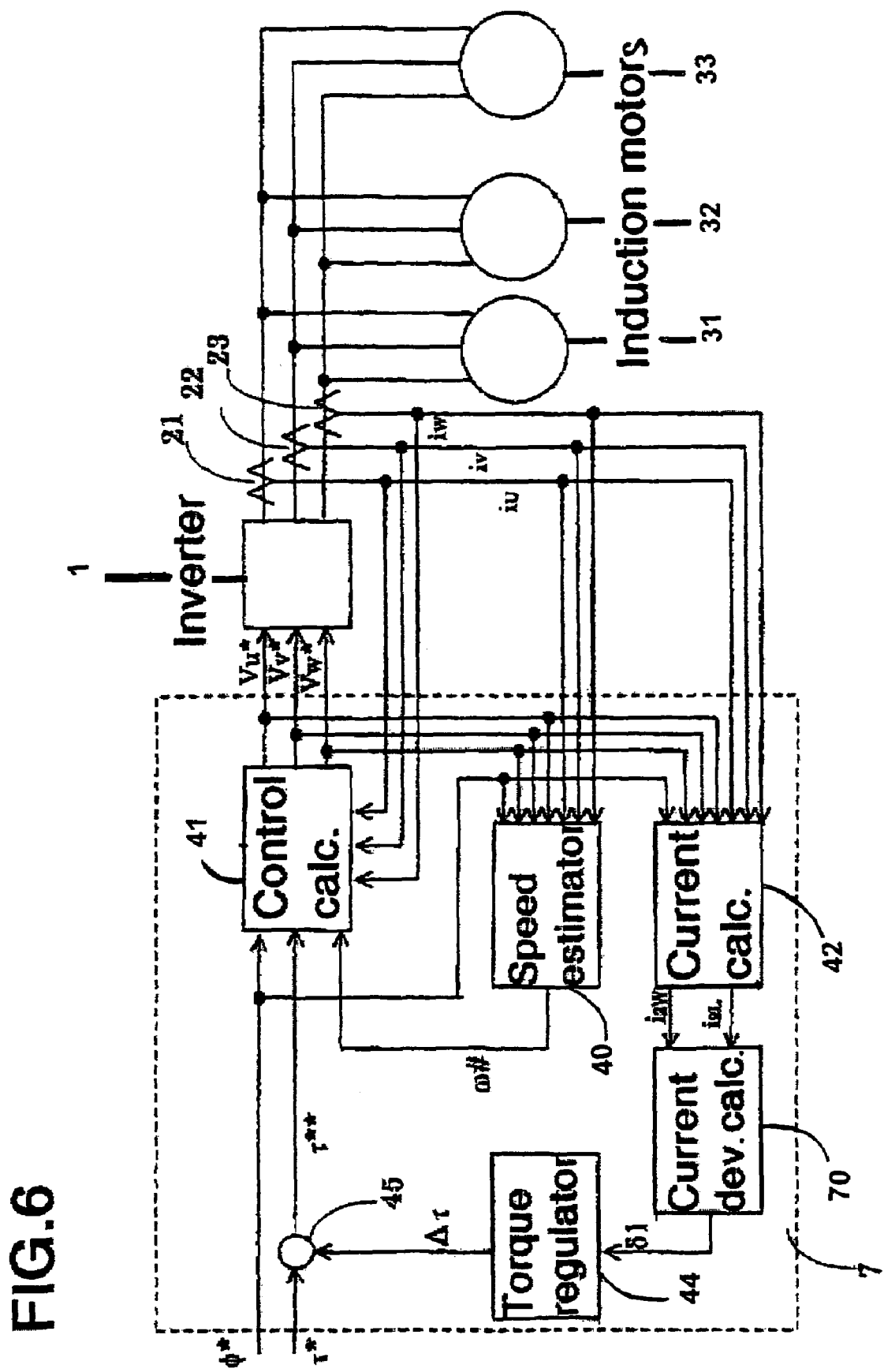
FIG. 6 is a block circuit diagram of a driving apparatus for driving multiple induction motors according to a third embodiment of the invention.

FIG. 6 is a block circuit diagram of a driving apparatus for driving multiple induction motors according to the third embodiment of the invention. Now the specific feature of the driving apparatus according to the third embodiment is described below. The W-axis component $i_{2W}$ and the L-axis component $i_{2L}$ of the total secondary current outputted from the secondary current calculating circuit 42 are inputted to a current deviation quantity calculating circuit 70. The current deviation quantity calculating circuit 70 calculates a current deviation quantity $\delta_1$ from the following formula (11), in which K is a coefficient for adjusting the set values of the motor constants.

$$\delta_1 = (i_{2L} - (K \cdot N \cdot \phi^*/2L\sigma))^2 + i_{2W}^2 - (K \cdot N \cdot \phi^*/2L\sigma)^2 \quad (11)$$

The above-described K changes as defined by the following formula (12), when the absolute value of $\delta_1$ is smaller than a specified value, to adjust the set values of the motor constants. In the formula (12), s is the Laplacean, Ti is an integration time constant, and the initial value of K is 1.

$$K = (1/sTi)\{(i_{2L} - (K \cdot N \cdot \phi^*/2L\sigma))^2 + i_{2W}^2 - (K \cdot N \cdot \phi^*/2L\sigma)^2\} \quad (12)$$

The other configurations and the operations are the same as those described with reference to FIG. 1 or 5. Thus, even when errors are caused between the motor constants set in advance and the actual motor constants, the rotating speed differences are prevented from widening by adjusting the setting errors.

Figure 7:
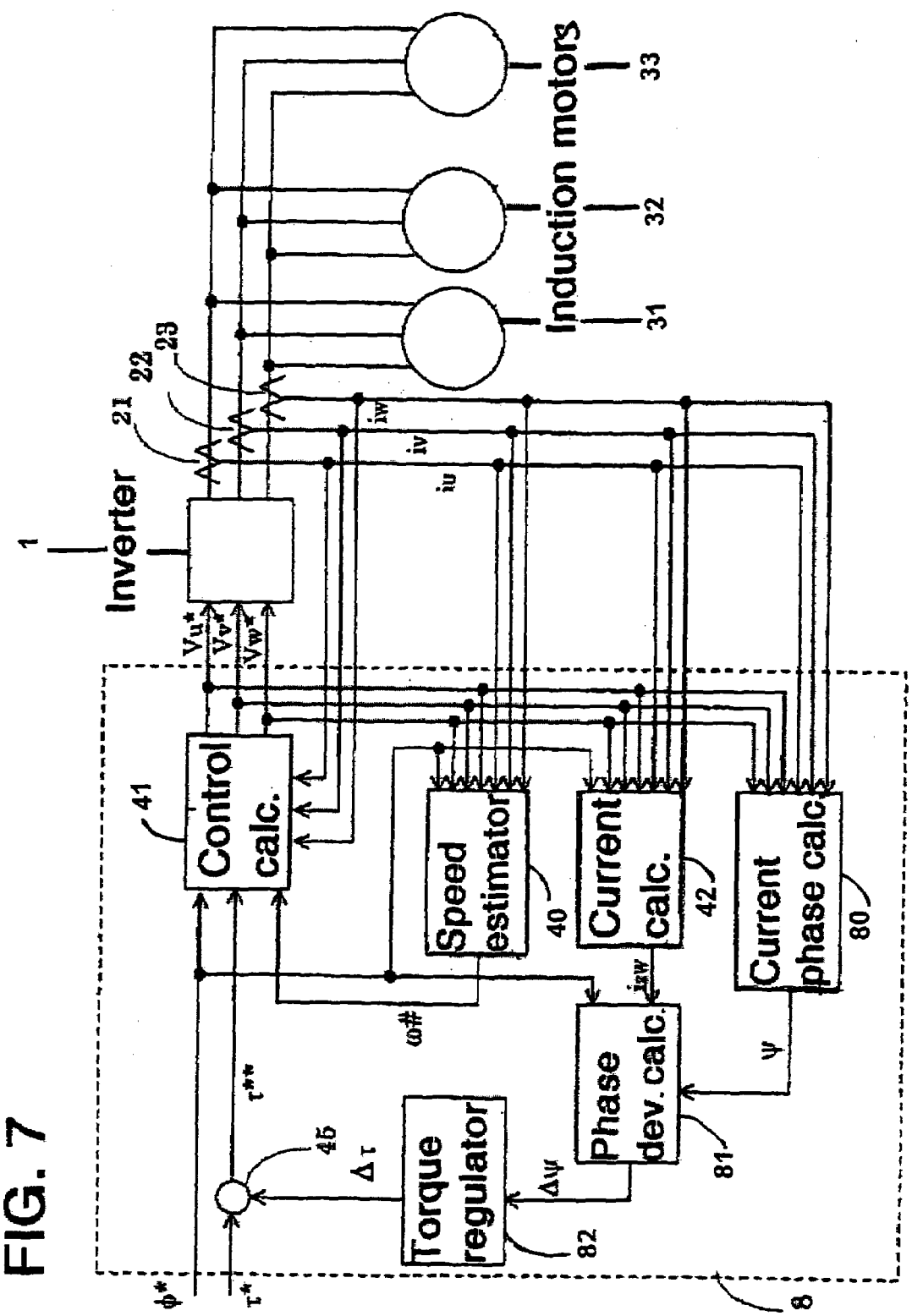
FIG. 7 is a block circuit diagram of a driving apparatus for driving multiple induction motors according to a fourth embodiment of the invention.

FIG. 7 is a block circuit diagram of a driving apparatus for driving multiple induction motors according to the fourth embodiment of the invention. Now the specific feature of the driving apparatus according to the fourth embodiment is described below. A secondary current phase calculating circuit 80 and a phase deviation quantity calculating circuit 81 are added to the driving apparatus according to the fourth embodiment. The primary reference voltages $v_U^*$, $v_V^*$, and $v_W^*$ outputted from the trans-vector control calculating circuit 41 and the inverter output currents $i_U$, $i_V$, and $i_W$ detected by the current detectors 21, 22, and 23 are inputted to the secondary current phase calculating circuit 80. The secondary current phase calculating circuit 80 calculates a phase difference $\Psi$ between the total secondary current vector and the primary voltage vector (hereinafter referred to simply as a "phase difference") from the following formula (13). The terms vd, vq, $i_{2d}$, and $i_{2q}$ in the formula (13) are calculated from the foregoing formulas (3) through (6).

$$\Psi = \tan^{-1}(v_q/v_d) - \tan^{-1}(i_{2q}/i_{2d}) \quad (13)$$

The phase difference $\Psi$ outputted from the secondary current phase calculating circuit 80, the W-axis component $i_{2W}$ of the total secondary current outputted from the secondary current calculating circuit 42, and the reference magnetic flux $\phi^*$ are inputted to the phase deviation quantity calculating circuit 81. The phase deviation quantity calculating circuit 81 calculates a phase difference deviation quantity $\Delta\Psi$ from the following formula (14).

$$\Delta\Psi = (1/2)\sin^{-1}(2L\sigma \cdot i_{2W}/N \cdot \phi^*) - \Psi \quad (14)$$

The phase difference deviation quantity $\Delta\Psi$ outputted from the phase deviation quantity calculating circuit 81 is inputted to a torque regulating circuit 82. The torque regulating circuit 82 calculates a torque reduction quantity $\Delta\tau$ from the phase difference deviation quantity $\Delta\Psi$ and the time variation of the phase difference deviation quantity $\Delta\Psi$. Since the other operations are the same as those of the conventional driving apparatuses, their descriptions are omitted. Now the detection of the rotating speed difference widening based on the phase difference deviation quantity $\Delta\Psi$ defined by the formula (14) will be described below.

Figure 8:
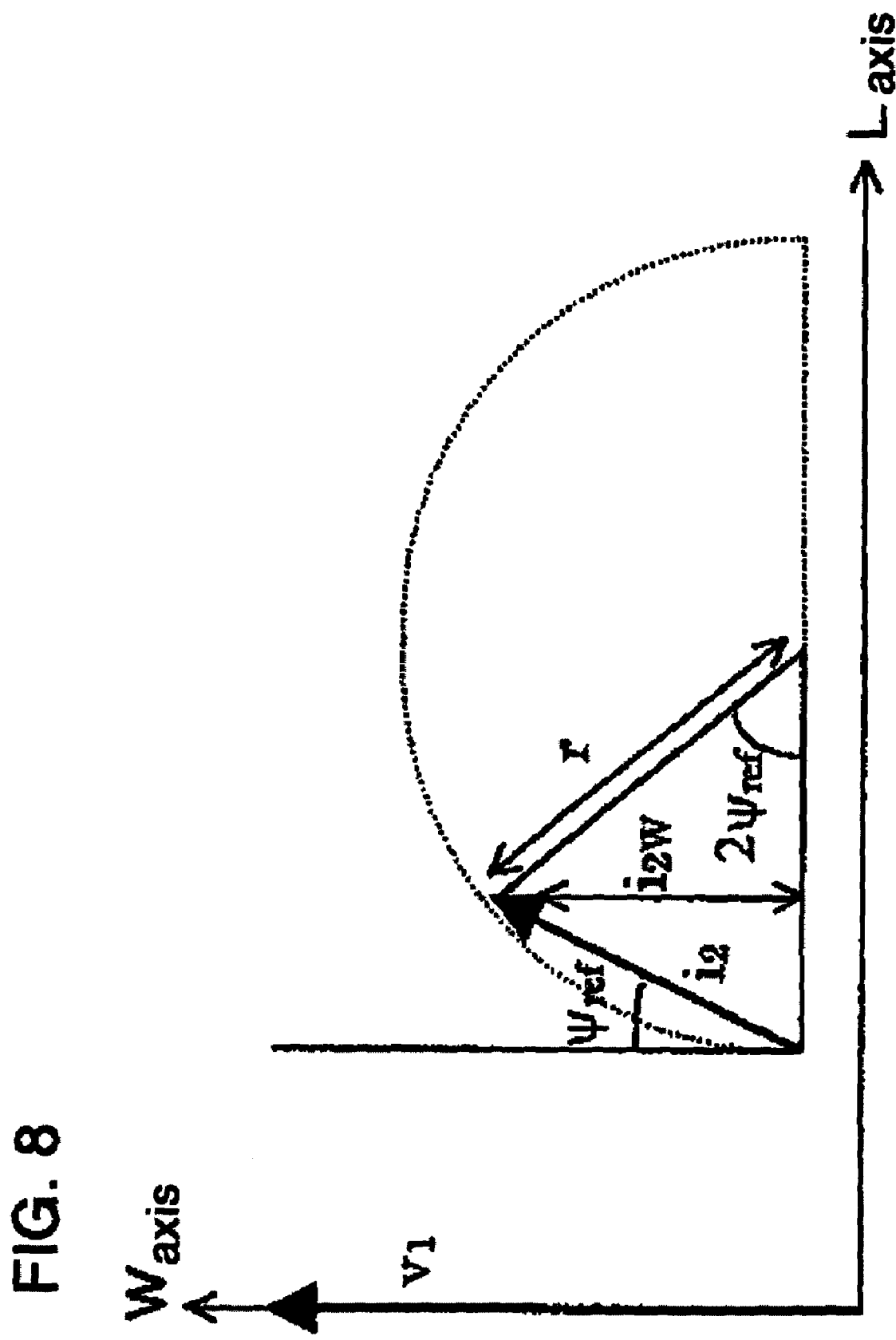
FIG. 8 is a vector diagram describing the phase difference between the primary voltage and the secondary current.

When the slip deviations between the motors are small, that is, when the rotating speed differences between the motors are small, the primary voltage vector and the current vectors extend as shown in FIG. 4, and the point of the secondary current vector is always on the circumference of a circle, the radius r thereof being defined by the foregoing formula (10). The apex angle of an isosceles triangle shown in FIG. 8, the base of which is the secondary current vector, is twice as wide as the phase difference $\Psi$. Therefore, the phase difference $\Psi$ref for the small rotating speed differences is expressed by the following formula (15) using the W-axis component of the secondary current.

$$\Psi ref = (1/2)\sin^{-1} i_{2W} N \cdot \phi^*/2L\sigma \quad (15)$$

As described above, the point of the secondary current vector removes from the circumference of a circle to the inside of the circle independently of the trans-vector control operations when the rotating speed difference widens. The displacement from the circumference is longer as the rotating speed differences are wider. Therefore, it is possible to detected the widening caused in the rotating speed differences quickly with the phase difference deviation quantity $\Delta\Psi$ defined by the formula (14) and it is possible to prevent the rotating speed differences from widening by adjusting the reference torque corresponding to the deviation quantity $\Delta\Psi$ and the time variation of the deviation quantity $\Delta\Psi$.

Figure 9:
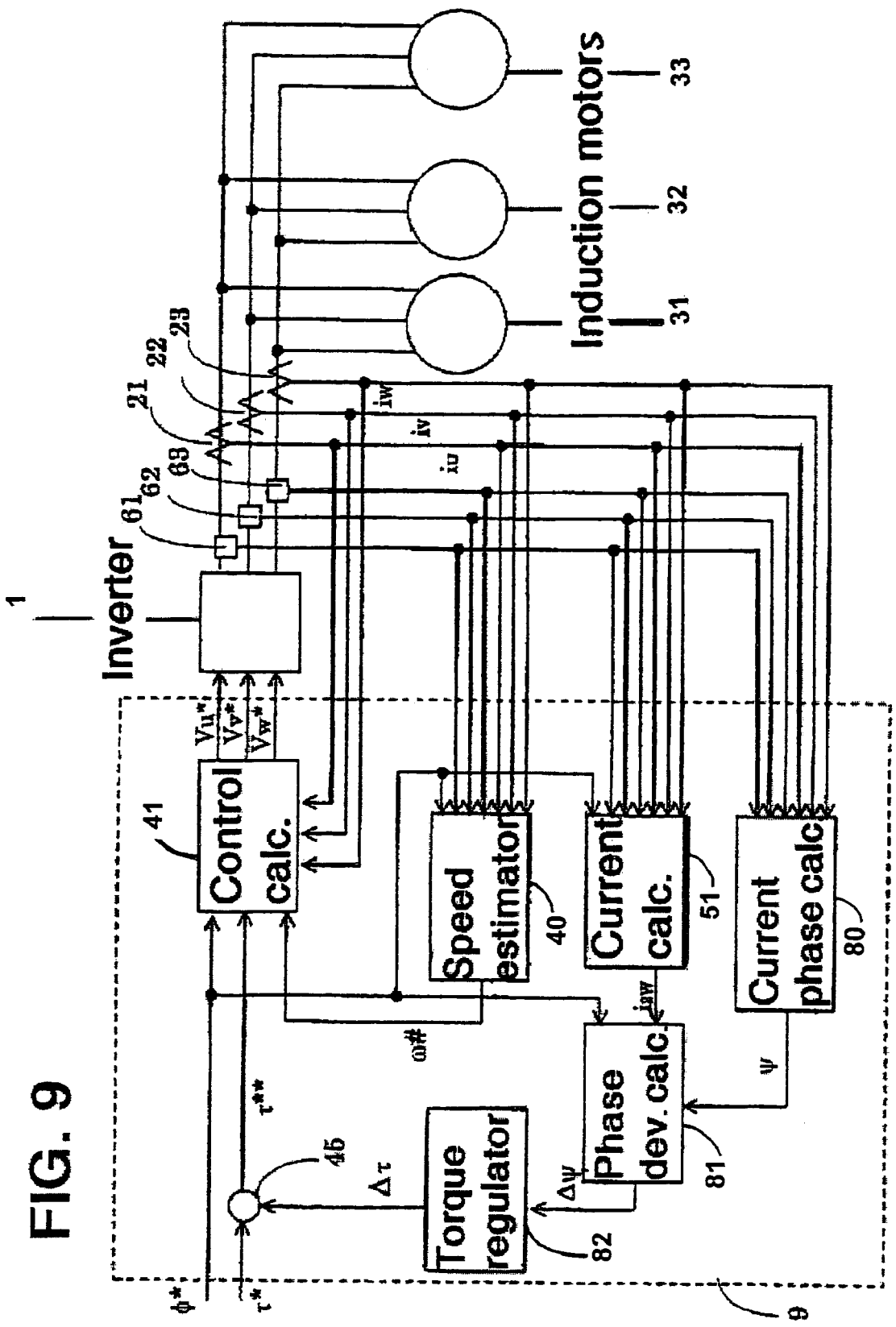
FIG. 9 is a block circuit diagram of a driving apparatus for driving multiple induction motors according to a fifth embodiment of the invention.

FIG. 9 is a block circuit diagram of a driving apparatus for driving multiple induction motors according to the fifth embodiment of the invention. Now the specific feature of the driving apparatus according to the fifth embodiment is described below. In FIG. 9, the inverter output voltages $v_U$, $v_V$, and $v_W$ detected by the voltage detectors 61, 62, and 63 are inputted to the rotating speed estimating circuit 50, the secondary current calculating circuit 51 and a secondary current phase calculating circuit 90 in place of the primary reference voltages $v_U^*$, $v_V^*$, and $v_W^*$ outputted from the trans-vector control calculating circuit 41 as shown in FIG. 7. Since the other configurations and the operations are the same as those described with reference to FIG. 7, their duplicated descriptions are omitted.

Figure 10:
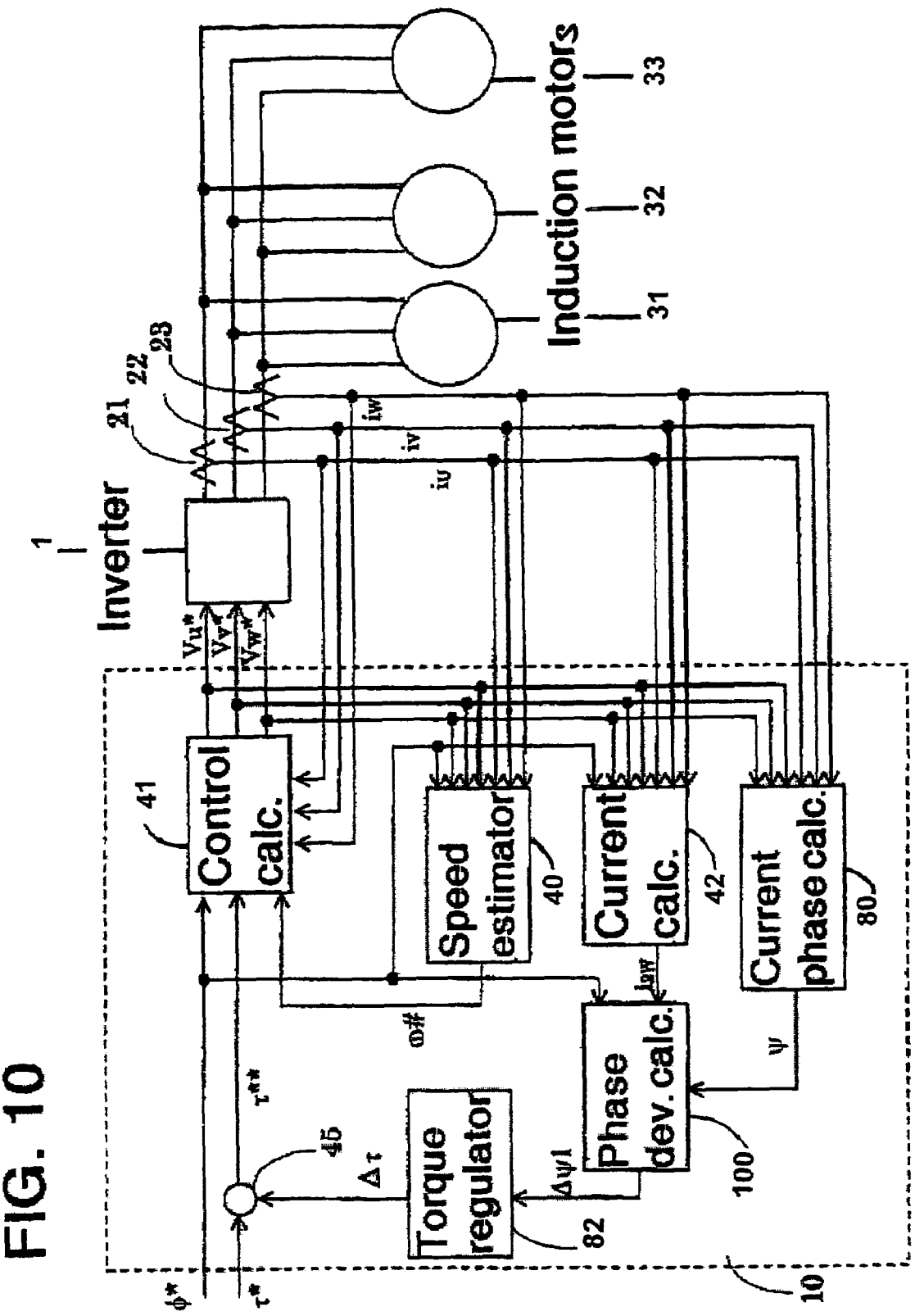
FIG. 10 is a block circuit diagram of a driving apparatus for driving multiple induction motors according to a sixth embodiment of the invention.

FIG. 10 is a block circuit diagram of a driving apparatus for driving multiple induction motors according to the sixth embodiment of the invention. Now the specific feature of the driving apparatus according to the sixth embodiment is described below. The W-axis component $i_{2W}$ of the total secondary current outputted from the secondary current calculating circuit 42, the phase difference $\Psi$ outputted from the secondary current phase calculating circuit 80, and the reference magnetic flux $\phi^*$ are inputted to a phase deviation quantity calculating circuit 100. The phase deviation quantity calculating circuit 100 calculates a phase difference deviation quantity $\Delta\Psi_1$ from the following formula (16). In the formula (16), K is a coefficient for adjusting the motor constants in the same manner as in the foregoing formula (12).

$$\Delta\Psi_1 = (1/2)\sin^{-1}(2L\sigma \cdot i_{2W}/K \cdot N \cdot \phi^*) - \Psi \quad (16)$$

The above-described K changes as defined by the following formula (17) when the absolute value of $\Delta\Psi_1$ is smaller than a specified value to adjust the set values of the motor constants. In the formula (17), Ti is an integration time constant, and the initial value of K is 1.

$$K = (1/sTi)\{(1/2)\sin^{-1}(2L\sigma \cdot i_{2W}/K \cdot N \cdot \phi^*) - \Psi\} \quad (17)$$

The phase difference deviation quantity $\Delta\Psi_1$ outputted from the phase deviation quantity calculating circuit 100 is inputted to the torque regulating circuit 82. The torque regulating circuit 82 calculates a torque reduction quantity $\Delta\tau$ from the phase difference deviation quantity $\Delta\Psi_1$ and the time variation of the phase difference deviation quantity $\Delta\Psi_1$. Since the other configurations and operations are the same as those described with reference to FIG. 9, their descriptions are omitted. Thus, even when errors are caused between the motor constants set in advance and the actual motor constants, the rotating speed differences are prevented from widening by adjusting the setting errors and by quickly detecting the rotating speed difference widening.

What is claimed is:

1. A driving apparatus for driving a plurality of induction motors connected in parallel to each other, the driving apparatus comprising:

a current calculator that calculates a total secondary current value, which is the sum of the secondary currents of all the induction motors;

a phase difference calculator that calculates the phase differences between the total secondary current value and the output voltage from the inverter;

a phase deviation quantity calculator that calculates a phase difference deviation quantity, for which the calculated phase difference deviates from a reference phase difference; and a torque regulator that regulates the torque based on the calculated phase difference deviation quantity.

2. The driving apparatus according to claim 1, wherein the reference phase difference is corrected based on the calculated phase difference.

* * * * *